United States Patent [19]

Clemens et al.

[11] 3,780,500
[45] Dec. 25, 1973

[54] REMOVAL OF SULFUR TRIOXIDE AND ACID MIST FROM GASEOUS STREAMS
[75] Inventors: David H. Clemens, Willow Grove; Robert Kunin, Yardley, both of Pa.
[73] Assignee: Rohm and Haas Company, Philadelphia, Pa.
[22] Filed: Feb. 15, 1973
[21] Appl. No.: 332,836

Related U.S. Application Data
[63] Continuation of Ser. No. 164,932, July 21, 1971.

[52] U.S. Cl............................ 55/73, 55/74, 423/244
[51] Int. Cl............................................. B01d 53/00
[58] Field of Search .....................................
  55/73–77; 210/24, 26; 423/244

[56] References Cited
UNITED STATES PATENTS

| | | | |
|---|---|---|---|
| 2,592,523 | 4/1952 | Ayers et al............................ | 55/73 X |
| 3,299,617 | 1/1967 | Dunklin............................... | 55/74 X |
| 3,346,484 | 10/1967 | Lewis.................................. | 55/73 X |
| 3,485,014 | 12/1969 | Atsukawa et al..................... | 55/73 |
| 3,498,026 | 3/1970 | Messinger et al.................... | 55/73 |
| 3,556,716 | 1/1971 | Pollio et al.......................... | 55/73 X |
| 3,709,977 | 1/1973 | Villiers-Fisher..................... | 423/244 |

*Primary Examiner*—Samih N. Zaharna
*Assistant Examiner*—Richard W. Burks
*Attorney*—G. W. F. Simmons et al.

[57] ABSTRACT

Sulfur trioxide ($SO_3$) and/or sulfuric acid mist are removed from the gaseous effluents, particularly those from sulfuric acid plants, by contacting the gas containing such components with a crosslinked, macroreticular, polymeric ion exchange resin containing a vinylpyridine moiety. The resin is a macroreticular weak base resin which can be regenerated with an alkaline material.

16 Claims, No Drawings

REMOVAL OF SULFUR TRIOXIDE AND ACID MIST FROM GASEOUS STREAMS

This is a continuation of application, Ser. No. 164,932 filed July 21, 1971.

This invention relates to the removal and/or adsorption of sulfur trioxide ($SO_3$ hereinafter) and sulfuric acid mist from gaseous streams by the use of certain macroreticular, weak base, anion exchange resins. The gaseous streams may be derived from various sources but the invention has particular utility and applicability in the control of $SO_3$ and/or sulfuric acid mist from the waste tailgas emissions of sulfuric acid plants. $SO_3$ and sulfuric acid mist, of course, are serious and particularly obnoxious contaminants and pollutants in the atmosphere and the effective removable of these pollutants represents an important advance in the environmental control of toxic or obnoxious pollutants. More especially, the present invention relates to the removal of $SO_3$ and sulfuric acid mist from a gaseous stream with a particular class of ion exchange resins that have extended life, outstanding resistance to oxidation, good capacity for $SO_3$ and good acid demisting capabilities, and also good elution or regeneration characteristics, including good chemical regeneration characteristics.

The particular resins that are useful are those termed macroreticular, weak base, anion exchange resins and which are polymers of a vinyl heterocyclic monomer. Preferably, the polymers are cross-linked polymers of a vinyl heterocyclic monomer. Such a resin, as more fully described below, is produced and used in a bead form, usually in a size of about 10 to 100 mesh (U. S. Standard Sieve Series), which contains a high degree of fixed polymeric porosity. The porous nature and surface area, i.e., the macroreticularity, and the particle size provides for a more effective adsorption and demisting of the $SO_3$ and/or $H_2SO_4$ acid mist. The specific nature of the polymer which comprises the backbone of the resin is relatively unimportant, but it is essential that the resin contain at least about 10 percent by weight of a vinyl heterocyclic monomer, and weak base, anion exchange functionality which is preferably pyridine functionality or pyridine-like functionality. However, in general, the backbone of these resins will be the cross-linked copolymer of (1) a polyunsaturated monomer containing a plurality of non-conjugated $CH_2=C<$ groups, which acts as a cross-linking agent and (2) a vinyl heterocyclic monomer or a mixture of a vinyl heterocyclic monomer and another copolymerizable monovinylidene or ethylenically unsaturated comonomer. As stated hereinabove, the weak base resin useful in the present invention must have good resistance to oxidation and must contain at least about 10 percent by weight of a vinyl heterocyclic monomer, more preferably at least about 25 percent by weight and most preferably at least about 50 percent by weight of said vinyl heterocyclic monomers.

Suitable polyunsaturated cross-linking agents include, for example divinylbenzene, divinylpyridine, divinyltoluenes, divinylnaphthalenes, diallyl phthalate, ethylene glycol diacrylate, ethylene glycol dimethacrylate, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate triallylcitrate, triallyl phosphate, N,N'-methylenediacrylamide, N,N'-methylene dimethacrylamide, N,N'-ethylenediacrylamide, trivinylbenzene, trivinylnaphthalene, polyvinylanthracenes and the polyallyl and polvinyl ethers of glycol glycerol, pentaerylthritol, resorcinol and the monothio or dithio derivatives of glycols.

Preferred cross-linking monomers include polyvinyl aromatic hydrocarbons, such as divinylbenzene and trivinylbenzene, glycol dimethacrylates, and polymethacrylates such as ethylene glycol dimethacrylate and trimethyolpropane trimethacrylate, and polyvinyl ethers of polyhydric alcohols, such as divinoxyethane and trivinoxypropane. The amount of cross-linking agent can be varied widely and can be as little as about 2 percent by weight or as much as about 90 percent by weight but since the total utilizable capacity of the final resin as an anion-exchange resin generally decreases with an increase in the amount of cross-linking agent, an amount of from about 2 percent to about 60 percent, and preferably from about 5 to 25 percent, on a weight basis is usually adequate.

Suitable monoethylenically unsaturated comonomers include esters of acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxpropyl acrylate, ethoxyphenyl acrylate, ethoxybenzyl acrylate, ethoxycyclohexyl acrylate, the corresponding esters of methacrylic acid, styrene, o-, m- and p-methyl styrenes, and o-, m-, and p-ethyl styrenes, vinyl naphthalene, vinyltoluene and vinylnaphthalene. A class of monomers of particular interest consists of styrene and the esters of acrylic and methacrylic acid with a $C_1$—$C_{10}$ aliphatic alcohol. Other suitable ethylenically unsaturated monomers include hydroxyethyl methacrylate and other hydroxyl containing acrylates and methacrylates.

Preferably, the macroreticular weak base resin used in the present invention are crosslinked vinylpyridine polymers or resins. Examples of suitable vinylpyridines are 2-vinylpyridine, 4-vinylpyridine, or alkyl substituted vinylpyridines such as 2-methyl-5-vinylpyridine, 2-ethyl-5-vinylpyridine, 3, methyl-5-vinylpyridine, 2,3-dimethyl-5-vinylpyridine, and 2-methyl-3-ethyl-5-vinylpyridine. The vinylpyridine constitutes at least about 10 percent by weight of the crosslinked resin more preferably at least about 25 percent by weight and most preferably at least about 50 percent by weight of said crosslinked resin. (The macroreticular, vinylpyridine resins, and vinyl heterocyclic resins can be made in known manner by following the teachings of British Pats. 932,125 and 932,126 and U. S. Patent application Ser. No. 98,955, filed December 16, 1970)

In the following Examples, all parts and percentages are by weight or unless otherwise stated.

EXAMPLE 1

A gaseous stream consisting mainly of $SO_2$, nitrogen, $SO_3$ and $H_2SO_4$ mist is taken from the stack of an operating sulfuric acid plant at a point following conventional acid demisting with a Brink's demister. The gas at the point where it is taken from the stack contains approximately 17.5 ppm. of combined $SO_3$ and $H_2SO_4$, calculated as $SO_3$. This gas is then passed through a column of dry, finely divided resin (a crosslinked, macroreticular 4-vinylpyridine resin as described below) one feet deep and 70 mm. in diameter. The gaseous stream, at a temperature in the range of about 75° to about 85° C., is passed through the column at the rate of approximately 19 liters per minute for 900 hours. Complete removal of sulfuric acid mist and $SO_3$ is obtained. This is demonstrated by the use of benzyl orange which is an acid indicating dye and which is placed in the bed. At the end of the 900 hours the front of the $SO_3$—$H_2SO_4$ has penetrated only 9 centimeters into the bed as indicated by a change in the color of the dye.

The resin used in this Example 1 is a macroreticular resin of about 91 percent 4-vinylpyridine crosslinked with about 7 percent divinylbenzene, the balance being ethylvinylbenzene, all percentages being on a weight basis. The resin, used in about a 20 to 70 mesh cut (U.S. Standard Sieve), has a porosity of about 0.59 ml./ml., and a surface area of about 6 sq. meters per gram. The resin has a capacity for pure $SO_3$ of at least about 7.0 meq./gm.

EXAMPLE 2

A quantity of the resin used in Example 1, namely, 4.36 grams (12 cc) is placed in a sintered funnel having a tubular portion about three-fourths inches in diameter. A bed or column of the resin of about 20 to 70 mesh size, about three-fourths inches high is formed. The temperature of the funnel is maintained at about 75° C. by thermostatic control. Air containing about 500 to 600 ppm. $SO_3$ and sulfuric acid mist (calculated as $SO_3$) is contacted with the resin by being passed through the funnel at the rate of 1,800 cc/minute [(150 bed volumes (BV)] per minute. The run is continued for 300 minutes and the exhausted resin is then chemically regenerated with a known quantity of base (NaOH) which, by calculation, reveals that 46.6 meq. [(meq. = milliequivalents in millimoles (mmoles)] of $H_2SO_4$ and $SO_3$ has been removed. This represents 10.7 meq./gm. of resin. (The resin is known to have a capacity of at least about 7.0 meq./gm. for pure $SO_3$; thus the run shows that both adsorption of $SO_3$ and demisting of $H_2SO_4$ mist is taking place, since the total achievable capacity (10.7) is substantially greater than the 7.0 meq./gm. value.)

Although the present process can be used to remove $SO_3$ and/or $H_2SO_4$ acid mist at higher concentrations (as is shown by Example 2), it is preferred that the present process be used where the concentration of $SO_3$ and/or sulfuric acid mist in the gaseous stream being treated is no greater than about 100 ppm. and, more preferably, no greater than about 15 to 50 ppm. In these ranges, chemical regenerations can be kept to a minimum and removal of the $SO_3$ and/or acid mist remains quantitative (or virtually total) over long operating periods.

The process of the present invention, because of its extremely effective removal of $SO_3$ and/or acid mist finds one of its important utilities or applications where it is employed ahead of, or before, an $SO_2$ adsorber or scrubber, such as where the $SO_2$ would be adsorbed by an ion exchange technique or where the $SO_2$ would be subject to a scrubbing out operation such as that performed in the known Wellman-Lord process which uses sodium or potassium bisulfite to scrub out $SO_2$, or the sodium formate process for removing $SO_2$. In primary $SO_2$ removal process such as those mentioned above, the presence of $SO_3$ and/or $H_2SO_4$ acid mist with $SO_2$ may "poison" the $SO_2$ adsorbent of other $SO_2$ removal agents or otherwise significantly reduce the effectiveness of the $SO_2$ removal process. The present process can also be used in an analytical technique to determine the amount of $SO_3$ and/or sulfuric acid mist present in a stream also containing $SO_2$ since the macroreticular, crosslinked vinylpyridine ion exchange resins used in the present invention will preferentially adsorb or remove (after initial saturation with $SO_2$) $SO_3$ and/or $H_2SO_4$ acid mist in the presence of $SO_2$. The $SO_3$ and/or sulfuric acid mist can be removed by the resin over a wide temperature range, but ordinarily this will be in the range of about 50°C. to about 100°C., and more preferably about 75°C. to about 85°C.

We claim:

1. A process for removing $SO_3$ and/or sulfuric acid mist from a first gaseous stream containing same which comprises contacting said stream with a crosslinked, macroreticular vinylheterocyclic weak base anion exchange resin, the vinylheterocyclic portion or moiety constituting at least 10 percent by weight of the resin, thereby removing said $SO_3$ and/or sulfuric acid mist from said first gaseous stream to produce a second gaseous stream which is essentially free of $SO_3$ and/or sulfuric acid mist.

2. A process for removing $SO_3$ and/or sulfuric acid mist from a first gaseous stream containing same which comprises contacting said stream with a crosslinked, dry macroreticular vinylpyridine weak base anion exchange resin, the vinylpyridine portion or moiety constituting at least 25 percent by weight of the resin, thereby removing said $SO_3$ and/or sulfuric acid mist from said first gaseous stream to produce a second gaseous stream which is essentially free of $SO_3$ and/or sulfuric acid mist.

3. A process according to claim 2 wherein the $SO_3$ and/or sulfuric acid mist is removed by adsorption and demisting.

4. A process according to claim 3 wherein the $SO_3$ and/or sulfuric acid mist is removed by the resin at a temperature in the range of about 50° C. to 100° C.

5. Process according to claim 3 wherein the $SO_3$ and/or sulfuric acid mist is substantially continuously removed by the resin at a temperature in the range of about 75° C. to about 85° C.

6. Process according to claim 2 wherein the vinylpyridine is 2-vinylpyridine, 4-vinylpyridine or an alkyl substituted vinylpyridine.

7. Process according to claim 4 wherein the vinylpyridine is 2-vinylpyridine, 4-vinylpyridine or an alkylsubstituted vinylpyridine.

8. Process according to claim 5 wherein the vinylpyridine is 2-vinylpyridine, 4-vinylpyridine or an alkylsubstituted vinylpyridine, said vinylpyridine moeity constituting at least about 50 percent of the resin.

9. Process according to claim 5 wherein the resin contains about 91 percent 4-vinylpyridine, and has a porosity of about 0.59 ml./ml. and a surface area of about 6 sq. meters/gm.

10. Process according to claim 9 wherein the resin is crosslinked with about 7 percent divinylbenzene.

11. Process according to claim 10 wherein the resin has a capacity for $SO_3$ and/or sulfuric acid of at least about 7 millimoles ($H_2SO_4$ + $SO_3$) per gram of resin and after substantial exhaustion of said capacity, the resin is regenerated with an alkaline material.

12. Process according to claim 2 wherein the resin is in the form of a finely divided particles or beads arranged in a column or bed.

13. Process according to claim 12 wherein the mesh size of the resin is about 20 to about 70 mesh.

14. Process according to claim 2 wherein the resin preferentially removes $SO_3$ and sulfuric acid mist in the presence of $SO_2$ or other acid gases.

15. Process according to claim 14 wherein the $SO_3$ and/or sulfuric acid mist are present in the first gaseous stream in an amount of up to about 100 ppm.

16. Process according to claim 14 wherein the $SO_3$ and/or sulfuric acid mist are present in the first gaseous stream in an amount of about 15 to 50 ppm. and the second gaseous stream contains about zero (0) ppm. of $SO_3$ and/or sulfuric acid mist (calculated as $SO_3$).

* * * * *